(12) United States Patent
Schaefer et al.

(10) Patent No.: US 10,858,151 B2
(45) Date of Patent: Dec. 8, 2020

(54) STORAGE CONTAINER

(71) Applicant: MUCKBOX, LLC, Chicago, IL (US)

(72) Inventors: Daniel Campbell Schaefer, Pleasant Ridge, MI (US); Patrick Michael Barron, Chicago, IL (US)

(73) Assignee: MUCKBOX, LLC, Chicago, IL (US)

( * ) Notice: Subject to any disclaimer, the term of this patent is extended or adjusted under 35 U.S.C. 154(b) by 27 days.

(21) Appl. No.: 15/985,968

(22) Filed: May 22, 2018

(65) Prior Publication Data

US 2018/0334287 A1    Nov. 22, 2018

Related U.S. Application Data

(60) Provisional application No. 62/509,605, filed on May 22, 2017.

(51) Int. Cl.
| | |
|---|---|
| *B65D 21/02* | (2006.01) |
| *B65D 1/40* | (2006.01) |
| *B65D 1/22* | (2006.01) |
| *B65D 5/46* | (2006.01) |
| *B65D 21/08* | (2006.01) |
| *F24S 25/11* | (2018.01) |

(Continued)

(52) U.S. Cl.
CPC ............. *B65D 21/023* (2013.01); *B65D 1/22* (2013.01); *B65D 1/40* (2013.01); *B65D 5/46072* (2013.01); *B65D 21/0223* (2013.01); *B65D 21/083* (2013.01); *B65D 25/20* (2013.01); *B65D 25/2841* (2013.01); *B65D 43/164* (2013.01); *F24S 25/11* (2018.05); *H02S 20/00* (2013.01); *B65D 2313/02* (2013.01); *B65D 2519/00024* (2013.01); *B65D 2519/00726* (2013.01); *B65D 2543/00018* (2013.01); *B65D 2543/00212* (2013.01); *B65D 2543/00296* (2013.01)

(58) Field of Classification Search
CPC .... B65D 21/023; B65D 21/0223; B65D 1/22; B65D 1/40; B65D 5/46072; B65D 21/083; B65D 5/46032; B65D 25/20; B65D 25/2841; B65D 43/164; B65D 2543/00018; B65D 2543/00212; B65D 2543/00296
See application file for complete search history.

(56) References Cited

U.S. PATENT DOCUMENTS 2,025,149 A * 12/1935 Barkhausen ........ H01M 2/1005
                                                    16/429
7,051,677 B2 * 5/2006 Van Epps, II ........... A01K 7/04
                                                    119/78

(Continued)

*Primary Examiner* — Christopher R Harmon
(74) *Attorney, Agent, or Firm* — Philip S. Hof

(57) ABSTRACT

A storage container includes a body, a lid, and two handles. The body defines a compartment between first and second side walls of the body. The compartment is accessible along a top end of the body. The first and second side walls include respective cavities that are recessed from exterior surfaces of the side walls via rims that define perimeters of the cavities. The lid is connected to the top end of the body and encloses the compartment when in a closed position. The two handles are tethered to the body via cords, and are configured to nest within the cavities of the corresponding side walls when not grasped by a person. First and second ends of the handles are configured to engage opposing portions of the corresponding rim to retain the handle nested in the cavity via an interference fit.

18 Claims, 7 Drawing Sheets

(51) Int. Cl.
*B65D 25/20* (2006.01)
*B65D 43/16* (2006.01)
*B65D 25/28* (2006.01)
*H02S 20/00* (2014.01)

(56) References Cited

U.S. PATENT DOCUMENTS

| | | | |
|---|---|---|---|
| 7,475,782 B2* | 1/2009 | Lombardi | A01M 31/00 |
| | | | 190/110 |
| 8,424,715 B2* | 4/2013 | Aiken | B65F 1/1468 |
| | | | 220/761 |
| 2019/0217999 A1* | 7/2019 | Wood | B65D 43/22 |
| 2019/0291922 A1* | 9/2019 | Gonitianer | B25H 3/02 |
| 2019/0308772 A1* | 10/2019 | Gonitianer | B25H 3/02 |

* cited by examiner

STORAGE CONTAINER

CROSS-REFERENCE TO RELATED APPLICATIONS

This application claims the benefit of U.S. Provisional Application No. 62/509,605, which was filed on May 22, 2017 and is titled Storage Container. The subject matter of which is herein incorporated by reference in its entirety.

BACKGROUND

The subject matter herein relates generally to storage containers for storing and transporting goods.

Storage containers are used today for containing goods for storage and transport. However, most storage containers have a utility that is limited to containing goods within an internal compartment. This limited utility may be a disadvantage during certain situations or activities, such as camping. For example, the goods (e.g., supplies and equipment) held by most known storage containers require the lid of the container to be open in order to access the goods. Plus, it may be difficult to maintain organization of the goods held within the compartment, and a person may have to remove and/or dig through a multitude of goods within the compartment to locate a specific item of interest. Besides containing goods, known storage containers may only have a limited number of other uses, such as use as a crude table or foot rest.

Accordingly, there is a need for storage containers that provide additional utility than merely as a device for containing goods within an internal compartment.

SUMMARY

In at least one embodiment, a storage container is provided that includes a body, a lid, and two handles. The body defines a compartment that is accessible through an opening along a top end of the body. The compartment is defined between first and second side walls of the body. Each of the first and second side walls includes a respective cavity that is recessed from a respective exterior surface of the side wall. A perimeter of each of the cavities is defined by a rim that projects inward from the exterior surface. The lid is connected to the top end of the body and is movable relative to the body between a closed position and an open position. The lid in the closed position encloses the compartment. The two handles are tethered to the first and second side walls via cords. Each of the two handles is elongated between a first end and a second end thereof. The handles are configured to nest within the cavities of the corresponding side walls when not grasped by a person. The first and second ends of each of the handles are configured to engage opposing portions of the rim to retain the handle nested in the cavity via an interference fit.

In at least one embodiment, a storage container is provided that includes a body, a lid, and two handles. The body defines a compartment that is accessible through an opening along a top end of the body. The body includes an inner rail and an outer rail at the top end. The inner rail defines a perimeter of the opening to the compartment. The outer rail surrounds the inner rail and is spaced apart from the inner rail to define a trench at the top end. The lid is connected to the top end of the body via hinges and is pivotable relative to the body between a closed position and an open position. The lid has an interior side that engages the top end of the body when in the closed position to enclose the compartment. The two handles are tethered to the body via cords. The inner rail defines notches in a top surface thereof that are configured to receive hooks of partitions that divide the compartment. The outer rail defines slots in a top surface thereof that are configured to receive hooks for securing accessories along an exterior of the body.

DETAILED DESCRIPTION

Figure 1:
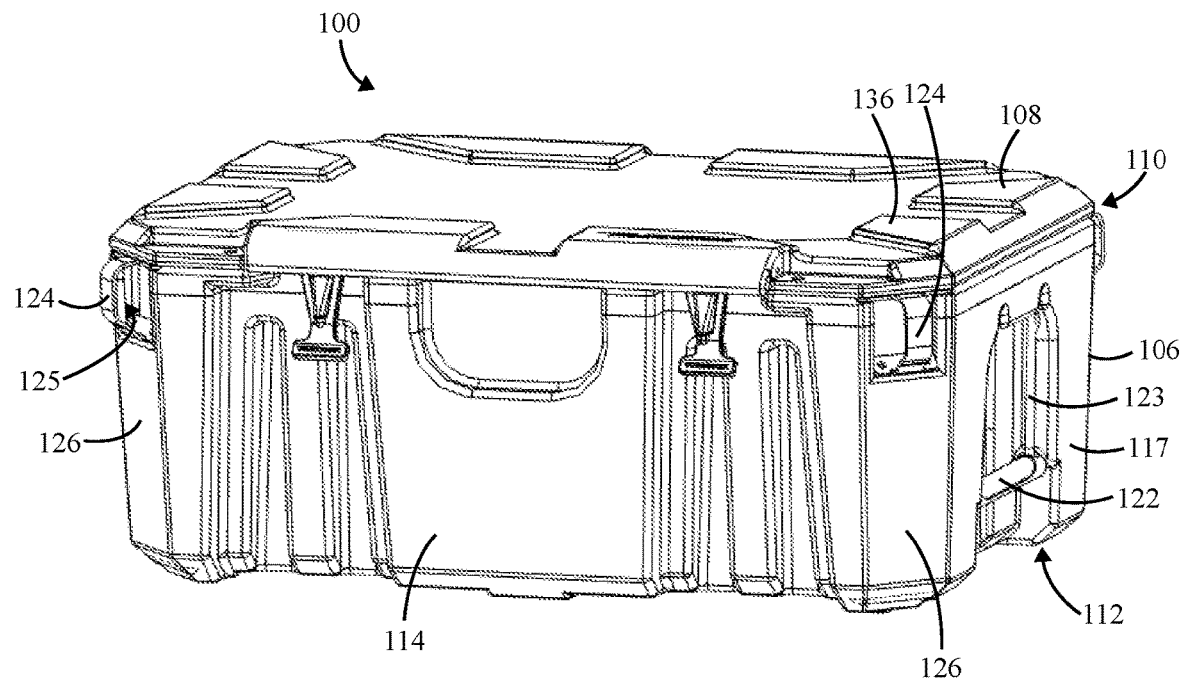
FIG. 1 is a front perspective view of a storage container according to an embodiment.
Figure 2:
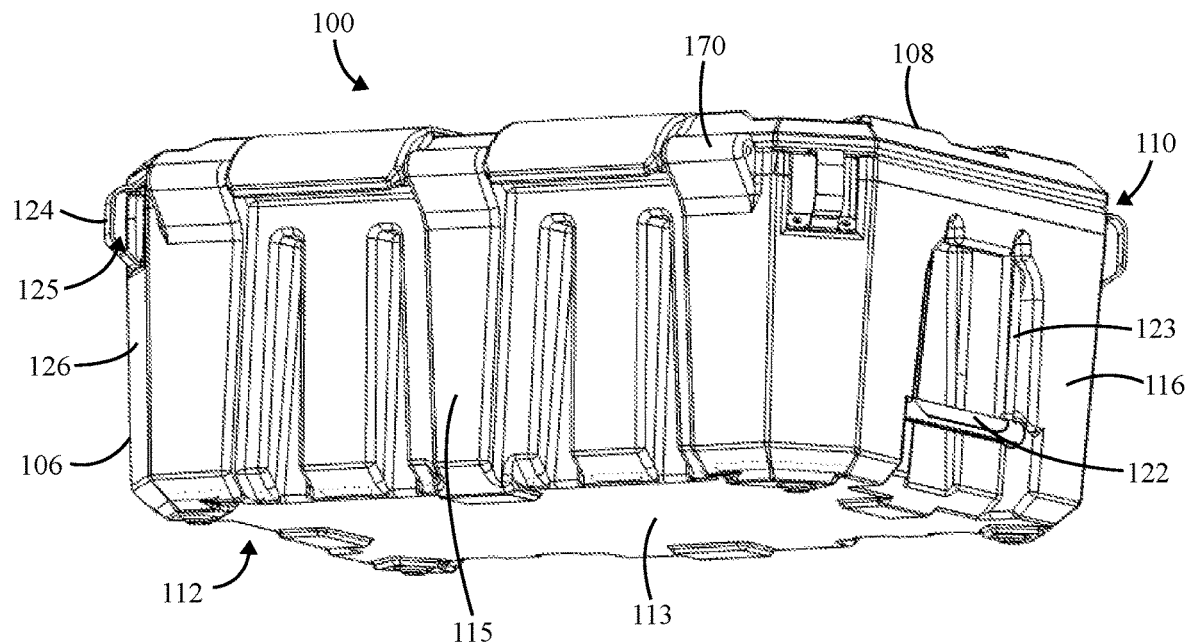
FIG. 2 is a rear perspective view of the storage container shown in FIG. 1.

FIG. 1 is a front perspective view of a storage container 100 according to an embodiment. FIG. 2 is a rear perspective view of the storage container 100 shown in FIG. 1. The storage container 100 includes a body 106 and a lid 108. The body 106 extends between a top end 110 and a bottom end 112. As used herein, relative or spatial terms such as "top," "bottom," "front," "rear," "first," and "second" are only used to distinguish the referenced elements and do not necessarily require particular positions or orientations in the surrounding environment of the storage container 100.

The body 106 includes a bottom wall 113 at the bottom end 112 and multiple vertical walls that extend from the bottom wall 113 to the top end 110. The bottom wall 113 defines a bottom of the storage container 100. The body 106 is box-shaped with four vertical walls in the illustrated embodiment, but may have a different shape in an alternative embodiment, such as a rounded shape or a hexagonal shape. The vertical walls include a front wall 114, a rear wall 115 opposite the front wall 114, a first side wall 116, and a second side wall 117 opposite the first side wall 116. The walls 113-117 define a compartment 302 (shown in FIG. 3) for storing goods (e.g., supplies, equipment, and the like). The body 106 may be composed of a plastic or one or more other polymers.

The lid 108 is mounted to the top end 110 of the body 106. The lid 108 is moveable relative to the body 106 between a closed position and an open position. The lid 108 is in the closed position in FIGS. 1 and 2. In the closed position, the lid 108 rests on the top end 110 of the body 106 and encloses the compartment 302 (shown in FIG. 3). As shown in FIG. 2, the lid 108 may be mounted to the rear wall 115 of the body 106 via hinges 170. The lid 108 pivots about the hinges 170 between the closed and open positions. Optionally, the lid 108 may be entirely removable from the body 106, such that the hinges 170 are able to be disconnected. In an alternative embodiment, the storage container 100 may lack the hinges 170, and may be press-fit onto the body 106 to achieve the closed position.

The storage container 100 includes handles 122 coupled to the first and second side walls 116, 117 of the body 106. The handles 122 are tethered to the body 106 via cords 123. The handles 122 allow a user to pick up and carry the storage container 100.

The storage container 100 may include tie-down bars 124 used for tying the storage container 100 to another object. For example, the storage container 100 may be secured on a trailer, a water vessel (e.g., canoe, boat, etc.), a luggage rack of an automobile, or the like. The tie-down bars 124 may be disposed at corners 126 of the body 106 between adjacent walls 114-117. In the illustrated embodiment, the tie-down bars 124 are vertically elongated along a vertical axis that extends through the top and bottom ends 110, 112 of the body 106. The tie-down bars 124 are affixed to the body 106 at the ends of the tie-down bars 124, and curve out of engagement with the body 106 to define passages 125 between the tie-down bars 124 and the body 106 for accommodating ropes, bungee cords, or the like therethrough.

Figure 3:
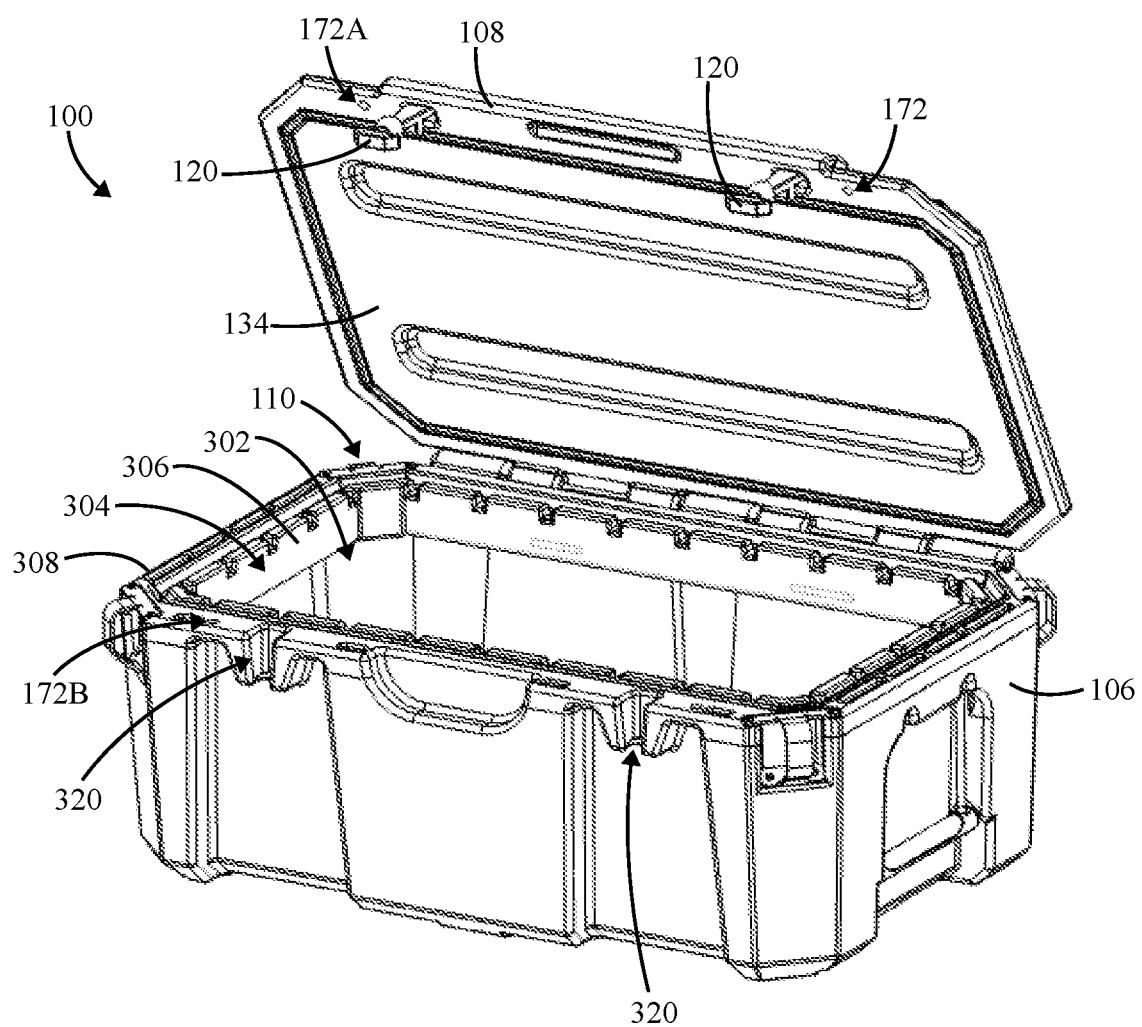
FIG. 3 is a front perspective view of the storage container according to an embodiment showing a lid in an open position relative to a body.

FIG. 3 is a front perspective view of the storage container 100 according to an embodiment showing the lid 108 in an open position relative to the body 106. The top end 110 of the body 106 defines an opening 304 to the compartment 302. The lid 108 includes an interior side 134 and an opposite, exterior side 136 (shown in FIG. 1). The interior side 134 engages the top end 110 of the body 106 to enclose the compartment 302 when the lid 108 is closed. When the lid 108 is open, the interior side 134 of the lid 108 is spaced apart from the top end 110 to allow access to the compartment 302 for loading and unloading goods.

In the illustrated embodiment, the lid 108 has securing anchors 120 that extend from the lid 108. The securing anchors 120 are configured to be received within retention channels 320 on the body 106 to secure the lid 108 in the closed position. The securing anchors 120 are releasable to allow for opening the lid 108. To prevent an unauthorized intruder from accessing the contents within the compartment 302, the storage container 100 may define pairs of locking apertures 172 through both the lid 108 and the body 106. The locking apertures 172 are configured to receive locking devices therethrough to prevent the lid 108 from opening. The locking device may be a pad lock, a zip tie, or the like. For example, the lid 108 defines one locking aperture 172A in each pair, and the body 106 defines the other locking aperture 172B (shown in greater detail in FIG. 4) in the pair that aligns with the corresponding locking aperture 172A when the lid 108 is closed to enable a locking device to extend through both apertures 172A, 172B.

In the illustrated embodiment, the body 106 includes an inner rail 306 and an outer rail 308 at the top end 110. The inner rail 306 is radially interior of the outer rail 308, such that the outer rail 308 surrounds the inner rail 306.

Figure 4:
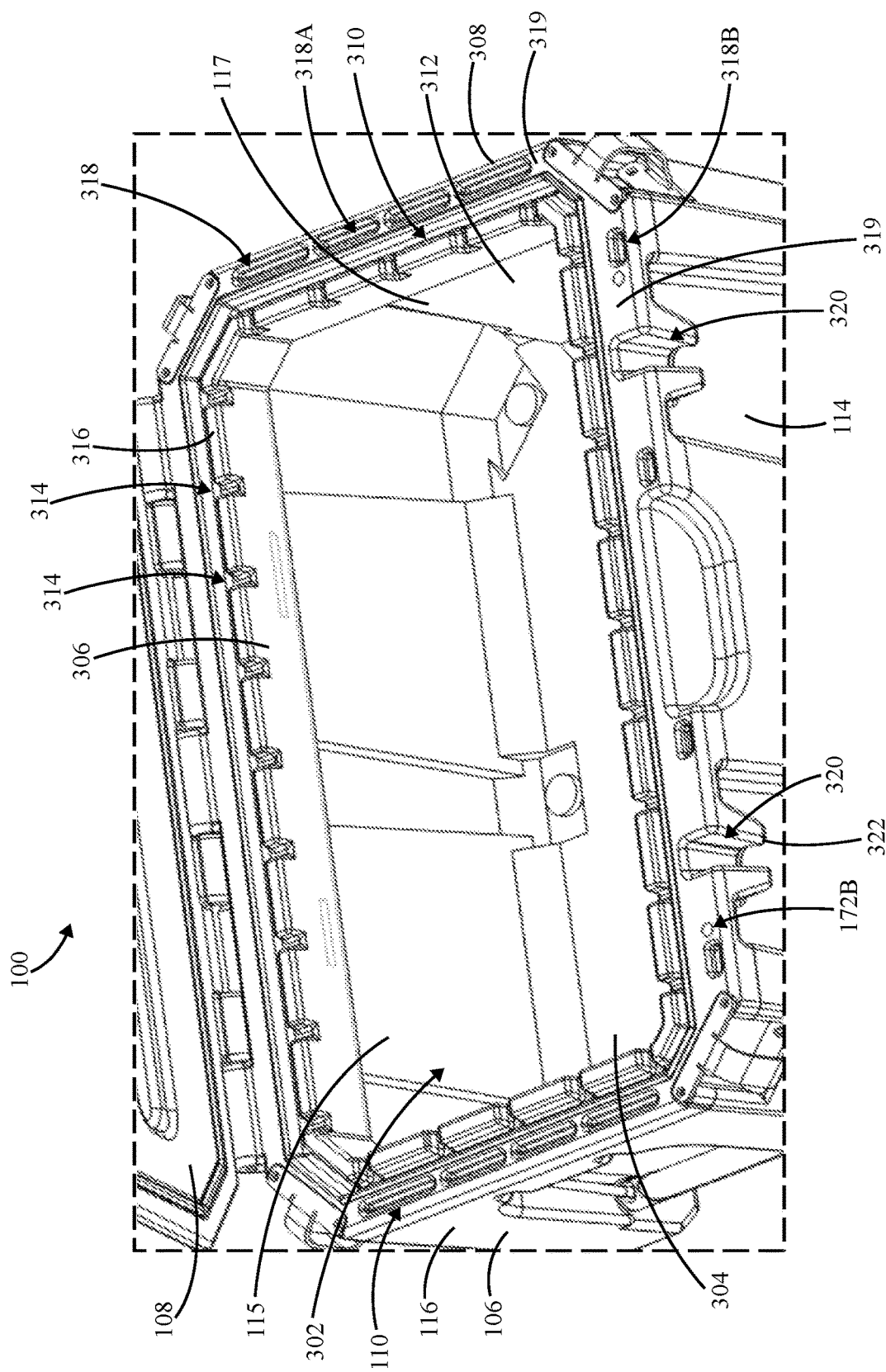
FIG. 4 is a close-up perspective view of a portion of the storage container showing a top end of the body.

FIG. 4 is a close-up perspective view of a portion of the storage container 100 showing the top end 110 of the body 106. The inner rail 306 defines the entire perimeter of the opening 304 to the compartment 302. The body 106 defines a trench 310 between the inner rail 306 and the outer rail 308 at the top end 110. The trench 310 may hold a compression seal (not shown) therein, such as a gasket, that engages an interior side 134 (FIG. 3) of the lid 108 when the lid 108 is closed to seal the compartment 302. The inner rail 306 may overhang into the compartment 302, such that the inner rail 306 juts out beyond inner surfaces 312 of the vertical walls 114-117 into the compartment 302.

In the illustrated embodiment, the inner rail 306 defines notches 314 in a top surface 316 of the inner rail 306. The notches 314 are configured to receive hooks (not shown) of partitions or dividers (not shown). The notches 314 allow a person to selectively install and remove partitions at customized locations and positions within the compartment 302 to divide the compartment 302 into smaller discrete spaces. In the illustrated embodiment, the notches 314 are evenly spaced apart from each other along the length of the inner rail 306 surrounding the opening 304, but the notches 314 may be unevenly spaced or located only along sub-lengths of the inner rail 306 in an alternative embodiment.

The outer rail 308 defines slots 318 along a top surface 319 of the outer rail 308 at the top end 110. The slots 318 are configured to accommodate hooks and/or fasteners (not shown) for securing accessories along the exterior of the body 106. For example, the elongated slots 318A that are located at the first and second side walls 116, 117 may be configured to receive fasteners for removably mounting saddle bags (not shown) or other accessories that hang along the exterior of the walls 116, 117. The small slots 318B in the outer rail 308 at the front wall 114 may be used for removably mounting tool-holding accessories, such as knife sheaths, canteen-holders, or the like, along the outside of the body 106. In an embodiment, when the lid 108 is closed, the interior side 134 (FIG. 3) of the lid 108 may engage and sandwich the hooks and/or fasteners that extend into the slots 318A, 318B between the lid 108 and the outer rail 308. For example, this engagement may cause the accessories to be secured on the storage container 100 when the lid 108 is closed, and the accessories may be removable from the body 106 of the storage container 100 when the lid 108 is opened by lifting the hooks and/or fasteners out of the slots 318A, 318B. Because the accessories hang along the exterior of the body 106, the accessories and the contents thereof are accessible when the lid 108 is closed, even though the goods within the compartment 302 are not accessible.

As shown in FIG. 4, the outer rail 308 overhangs the front wall 114 and defines retention channels 320 for receiving the securing anchors 120 (FIG. 3) therein. For example, the securing anchors 120 may engage a lower lip 322 of the outer rail 308 at the retention channels 320 to tie down the lid 108 in the closed position. The outer rail 308 defines the locking apertures 172B adjacent to the retention channels 320 for receiving pad locks, cable ties, or other locking devices therethrough to lock the lid 108 in the closed position, preventing animals and would-be thieves from accessing the compartment 302.

Figure 5:
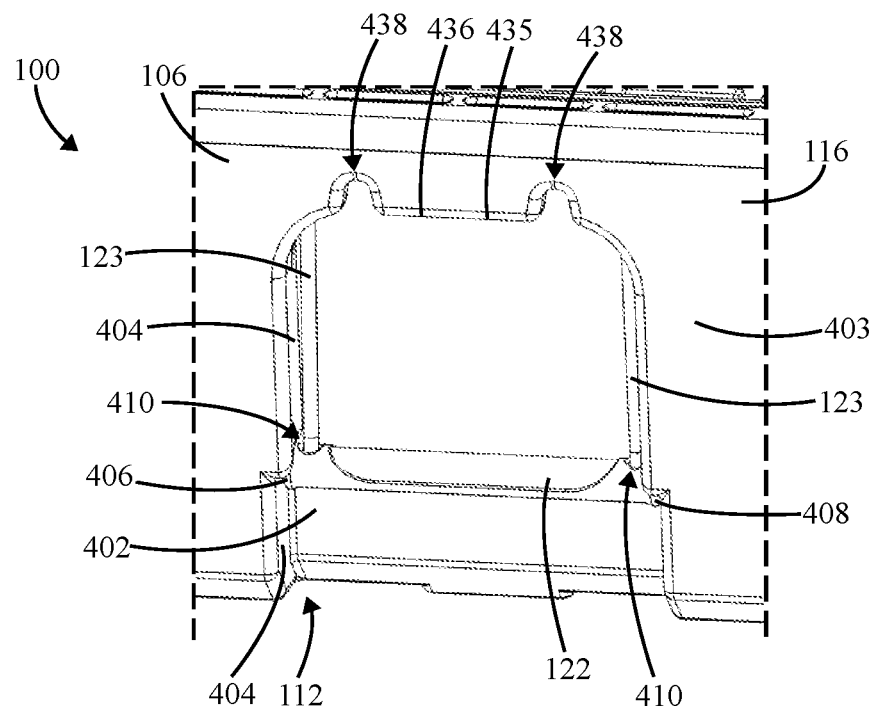
FIG. 5 is a first close-up side perspective view of the storage container showing a handle.
Figure 6:
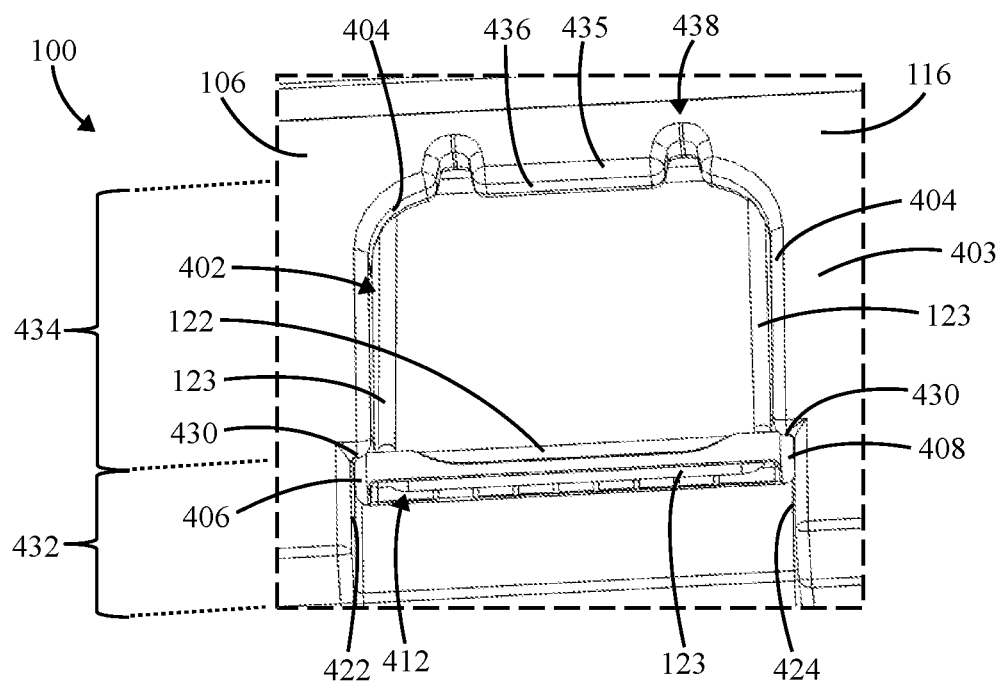
FIG. 6 is a second close-up perspective view of the storage container showing the handle depicted in FIG. 5.

FIG. 5 is a first close-up side perspective view of the storage container 100 showing one of the handles 122. FIG. 6 is a second close-up perspective view of the storage container 100 showing the handle 122 depicted in FIG. 5. In the illustrated embodiment, the handle 122 nests within a cavity 402 of the side wall 116 of the body 106. The cavity 402 is recessed from an exterior surface 403 of the side wall 116. A perimeter of the cavity 402 is defined by a rim 404 that projects inward from the exterior surface 403.

The handle 122 may be a rod that extends between first and second ends 406, 408 thereof. The handle 122 defines two apertures 410 proximate to the ends 406, 408. The handle 122 is tethered to the body 106 of the storage container 100 via at least one cord 123. The cord 123 may be a flexible rope, strap, or the like. The cord 123 projects through the apertures 410 in the handle 122. The handle 122 is hollow in the illustrated embodiment, defining a hollow space 412 that is fluidly connected to the apertures 410. The hollow space 412 is configured to allow for continuously routing the cord 123 through the handle 122 between the two apertures 410. For example, in the illustrated embodiment, a single cord 123 enters the handle 122 through one aperture 410, is routed within the hollow space 412 along a length of the handle 122 and exits the handle 122 through the other aperture 410. The handle 122 may be a unitary, monolithic member that is formed via molding. The portion of the handle 122 opposite the apertures 410 may optionally be open, allowing the cord 123 to be visible within the hollow space 412 as shown in FIG. 6. In an alternative embodiment, two discrete cords 123 may be affixed to the handle 122 instead of a single cord 123.

In an embodiment, the length of the handle 122 between the ends 406, 408 is approximately the same as a width of the cavity 402 between a first portion 422 of the rim 404 and an opposing, second portion 424 of the rim 404 to enable the handle 122 to be held within the cavity 402 via an interference fit. For example, the first end 406 of the handle 122 engages the first portion 422 of the rim 404, and the second end 408 engages the second portion 424 of the rim 404. The interference fit is overcome by a person grasping the handle 122 and pulling the handle 122 out of the cavity 402.

The rim 404 may define opposing shoulders 430 that segment the cavity 402 into a wide region 432 and a narrow region 434. The narrow region 434 extends from the shoulders 430 upward towards a top 435 of the cavity 402. The wide region 432 extends from the shoulders 430 downward towards the bottom end 112 of the body 106. The lateral width of the narrow region 434 is less than the lateral width of the wide region 432. In the illustrated embodiment, the handle 122 nests into the wide region 432, and may abut against the shoulders 430. The cord 123 extends from the handle 122 along the narrow region 434 to the top 435 of the cavity 402. Optionally, a depth of the cavity 402 (e.g., defined from the exterior surface 403 of the side wall 116 inward towards the compartment 302) is greater along the wide region 432 than along the narrow region 434.

In an embodiment, the rim 404 has a ceiling portion 436 at the top 435 of the cavity 402. The ceiling portion 436 may have an ergonomic shape that allows a person to grip the ceiling portion 436 for lifting the storage container 100 without pulling the handle 122 out of the cavity 402. In the illustrated embodiment, of the ceiling portion 436 of the rim 404 defines two rabbit ear indents 438. The cord 123 is configured to enter the rabbit ear indents 438 when a person uses the handle 122 to lift the storage container 100. The rabbit ear indents 438 may increase the distance that the handle 122 extends from the fixation location at which the cord 123 is affixed to the body 106. The increased distance may be more ergonomic for the person or persons lifting the storage container. For example, the increased distance may provide additional clearance between the handle 122 and the lid 108 of the storage container 100, reducing the risk of the person's hand scraping against the lid 108 when holding the handle 122. The fixation location of the cord 123 to the body 106 may be at or proximate to the ceiling portion 436 of the rim 404. For example, the cord 123 may be sandwiched underneath (e.g., inward of) the ceiling portion 436.

Figure 7:
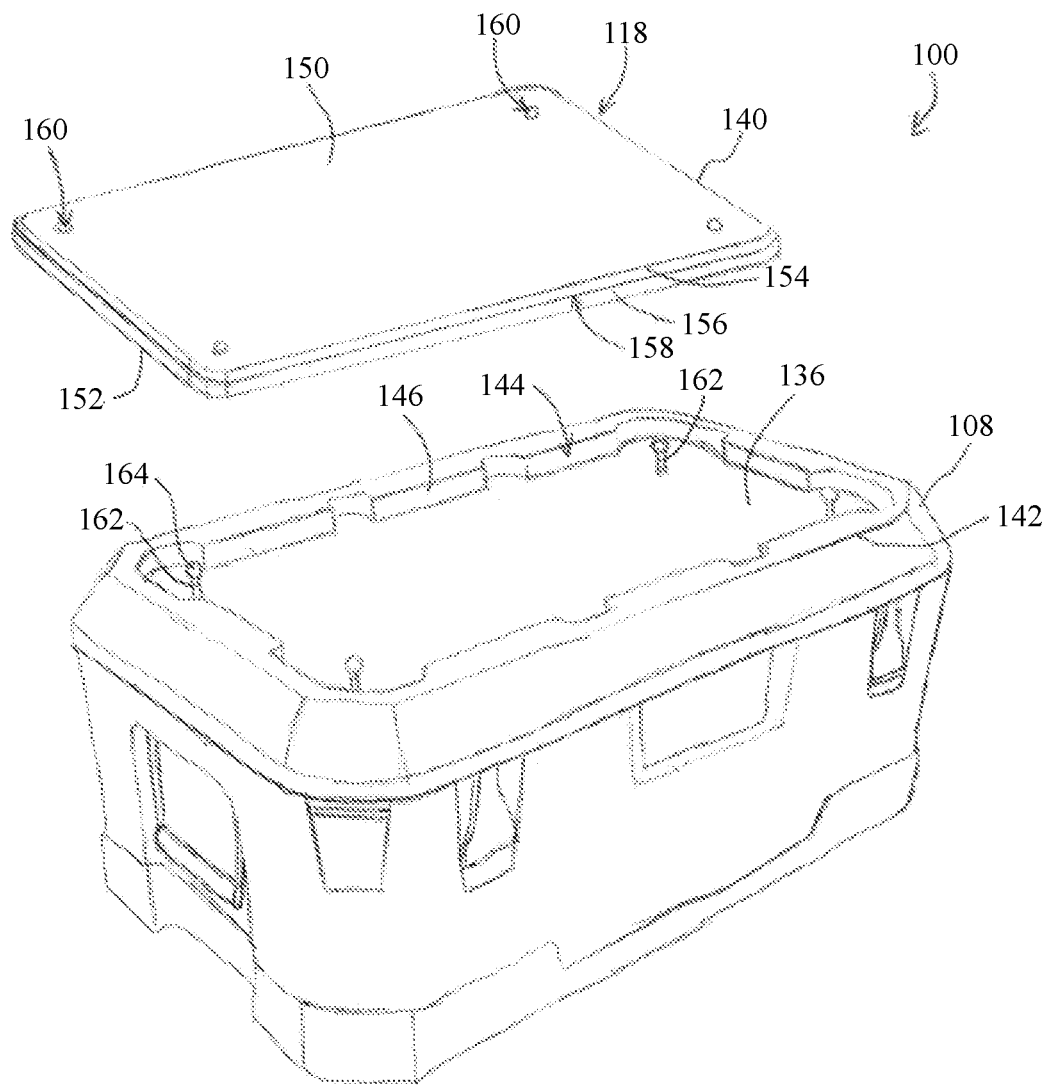
FIG. 7 is an exploded perspective view of the storage container according to an alternative embodiment.

FIG. 7 is an exploded perspective view of the storage container 100 according to an alternative embodiment. In the illustrated embodiment, the storage container 100 includes at least one panel 118 that is removably mountable to the lid 108 along the exterior side 136 thereof. The storage container 100 according to the embodiment shown in FIGS. 1-6 optionally does not have a removable panel on the lid 108. Because the panel 118 is mountable on the exterior side 136, a person can utilize the panel 118, remove the panel 118, or attach the panel 118 when the lid 108 is in the closed position. For example, a person does not need to access the compartment 302 to access, attach, and/or remove the panel 118. The panel 118 is shown removed from the lid 108 in the illustrated embodiment.

The panel 118 is mounted to the lid 108 along a central area of the lid 108. The panel 118 may be composed of a different material than the lid 108. For example, the lid 108 may be composed of a plastic or another polymer material, and the panel 118 may be composed of one or more metals. Optionally, the lid 108 may be configured to hold multiple panels 118 that are stacked vertically on top of each other and/or disposed laterally next to one another across the plane of the lid 108. By attaching the panel(s) 118 to the lid 108, similar types of panels or equipment need not be contained within the compartment 302, which frees up space in the compartment 302 for accommodating other goods.

In an embodiment, the panel 118 is planar and has a surface area that is smaller than the exterior side 136 of the lid 108. The panel 118 is configured to be held along a central area of the lid 108 such that outer edges 140 of the panel 118 do not protrude beyond outer edges 142 of the lid 108. In an embodiment, the lid 108 defines a depression 144 along the exterior side 136. The depression 144 receives the panel(s) 118 therein. A perimeter of the depression 144 is defined by a ridge 146. When the panel 118 is mounted to the lid 108 in the depression 144, the panel 118 may be flush with the portion of the exterior side 136 surrounding the depression 144 or at least slightly recessed relative to the exterior side 136.

The panel 118 includes a first side 150 and an opposite second side 152. In the illustrated embodiment, the panel 118 is a hybrid panel that includes a board 154 and a plate 156. The board 154 defines the first side 150 of the panel 118, and is composed of a dielectric material. The board 154 may be a cutting board. The dielectric material may be wood, plastic, rubber, silicone, or the like. The plate 156 is affixed to the board 154 at a seam 158 and defines the second side 152 of the panel 118. The plate 156 is composed of a metal material, such as aluminum, steel, or the like. The plate 156 may be affixed to the board 154 via an adhesive, a fastener, or the like. The hybrid panel 118 is reversible such that a user can use the board 154 as a cutting board when the first side 150 faces upward, and can flip the panel 118 over such that the second side 152 faces upward to use the plate 156. The plate 156 can be used for various functions, such as a planar surface on which to set a portable stove, a pot, or the like. Because the plate 156 is composed of metal, the plate 156 may be able to withstand relatively high temperatures, such as temperatures greater than lid 108 is able to withstand without damage.

In alternative embodiment, the board 154 and the plate 156 are not part of a single hybrid panel, but rather are two separate and discrete panels 118. The board 154 and the plate 156 can be stacked together and mounted to the exterior side 136 of the lid 108. The board 154 and the plate 156 may both be received within the depression 144. Optionally, the depression 144 may be sized to accommodate three or more stacked panels 118 therein. The multiple panels 118 may be different types of panels used for different tasks. In addition to, or as an alternative to, the cutting board 154 and/or the metal plate 156, other types of panels 118 may include a solar panel, an induction cooking panel, or the like.

The panel 118 may be removably mounted to the lid 108 via fasteners, hooks, clips, tabs, latches, interference fits, or the like. In the illustrated embodiment, the panel 118 defines multiple apertures 160 extending through the panel 118 between the first and second sides 150, 152. The apertures 160 are configured to receive fasteners therethrough. In the illustrated embodiment, the lid 108 includes posts 162 projecting upward from within the depression 144. The posts 162 are configured to be received in corresponding apertures 160 of the panel 118 to mount the panel 118 to the lid 108. The posts 162 may include large diameter heads 164 that may provide a retention force that resists the panel 118 dismounting from the lid 108 until at least a threshold amount of force is applied to the panel 118. The heads 164 may be at least partially compressible to fit through the apertures 160. In an alternative embodiment, clips, straps, threaded fasteners (e.g., screws, bolts, etc.), or the like may be inserted through the apertures 160 to mount the panel 118 to the lid 108.

Figure 8:
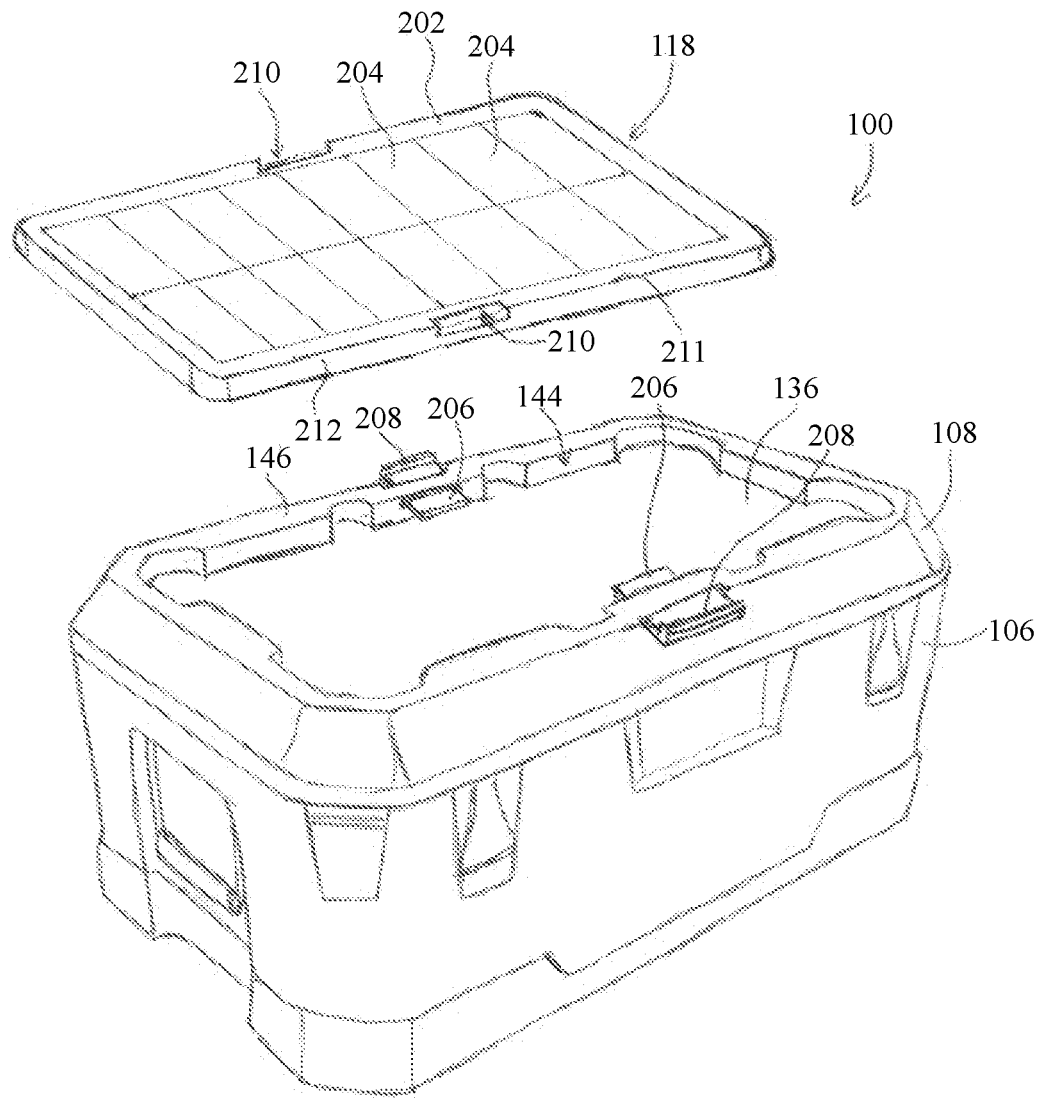
FIG. 8 is an exploded perspective view of the storage container showing a panel removed from the lid according to another alternative embodiment.

FIG. 8 is an exploded perspective view of the storage container 100 showing the panel 118 removed from the lid 108 according to another alternative embodiment. In the illustrated embodiment, the panel 118 is a solar panel 202 that includes multiple photovoltaic cells 204 disposed thereon. The solar panel 202 is configured to generate electrical current using solar radiation. The solar panel 202 may be used to provide electrical current to power various devices, such as mobile phones, laptop computers, lights, radios, induction cooktops, and the like. Optionally, the storage container 100 may hold a battery (not shown) that is connected to the solar panel 202 and configured to store the electrical current for later usage. For example, the battery may be mounted to the interior side 134 (shown in FIG. 3) of the lid 108, mounted along an exterior of the body 106, or held within the compartment 302 (FIG. 3).

In another embodiment, the storage container 100 may include an electrical device that is integrated onto the lid 108. The electrical device may be disposed next to the solar panel 202 on the exterior side 136 of the lid 108 and electrically connected to the solar panel 202 via a wired connection. The solar panel 202 may supply electrical current to the device for powering the device. For example, the electrical device on the lid 108 may be an induction cooktop, one or more lights, an audio speaker device, or the like.

Although only the solar panel 202 is shown in FIG. 8, it is recognized the lid 108 may be configured to hold additional panels stacked with the solar panel 202 in the depression 144. For example, the depression 144 may be sized to accommodate the solar panel 202, the cutting board 154, the metal plate 156, and/or the like.

In the illustrated embodiment, the solar panel 202 is retained within the depression 144 when mounted to the lid 108 via at least one retractable latch 206 in the lid 108. The lid 108 includes two retractable latches 206 in the illustrated embodiment, but may include only one or more than two latches 206 in other embodiments. The latches 206 are mounted to the ridge 146 and movable relative to the ridge 146 between an extended position and a retracted position. The latches 206 are connected to handles 208 that allow a user to selectively move the latches 206 between the extended and retracted positions. Optionally, the solar panel 202 defines recesses 210 along an outer edge 212 that are configured to align with the latches 206 when the solar panel 202 is received in the depression 144. The recesses 210 are cut-out segments of the panel 202 along upper corners 211 of the panel 202.

Figure 9:
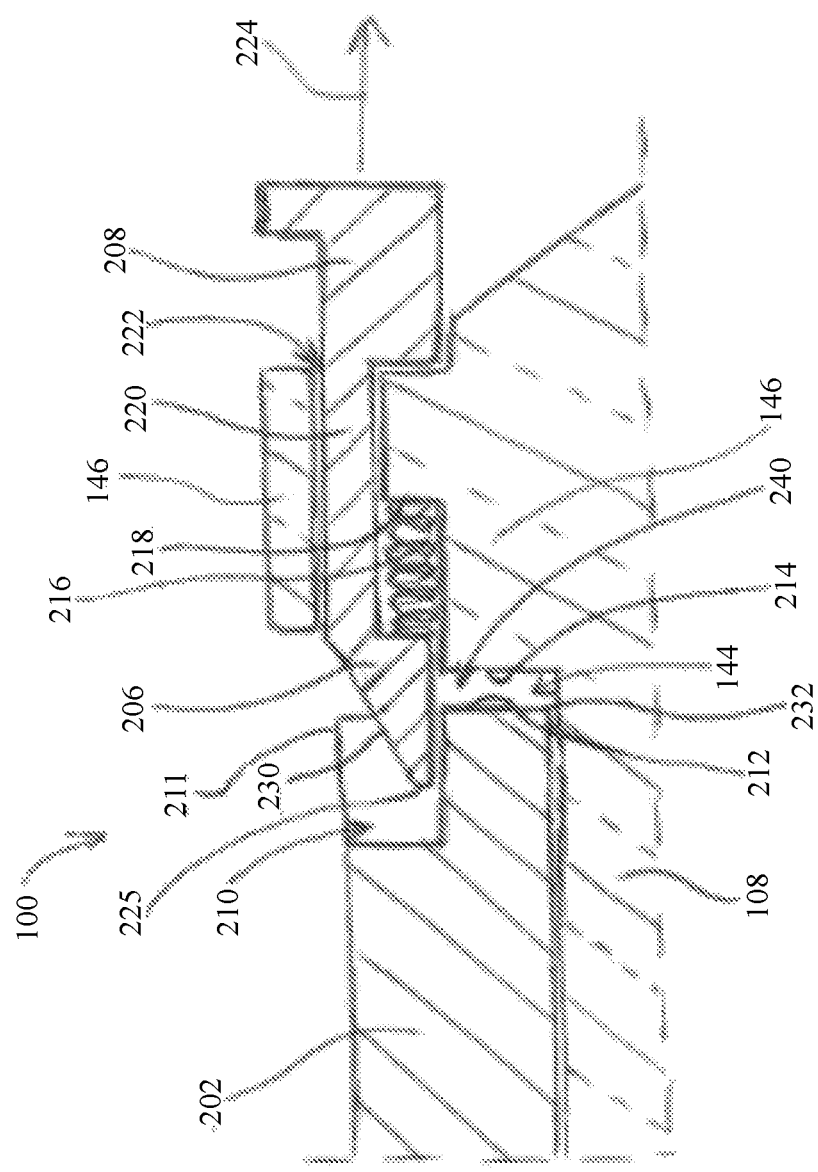
FIG. 9 shows a cross-sectional view of a portion of the storage container according to the embodiment shown in FIG. 8 depicting a retractable latch in an extended position.

FIG. 9 shows a cross-sectional view of a portion of the storage container 100 according to the embodiment shown in FIG. 8 depicting one of the retractable latches 206 in an extended position. In FIG. 9, the solar panel 202 is disposed within the depression 144, and the latch 206 is in the extended position. The latch 206 in the extended position protrudes from an inner wall 214 of the ridge 146 and extends vertically above a portion of the panel 202 to secure the panel 202 to the lid 108. For example, the latch 206 blocks the solar panel 202 from being lifted vertically upward out of the depression 144. In the illustrated embodiment, the latch 206 is received in the recess 210 of the solar panel 202 and extends above a recessed portion of the panel 202. In an alternative embodiment, the latch 206 may extend above the upper corner 211 of the panel 202. In an embodiment, the latch 206 is biased in the extended position. The latch 206 is biased in the extended position by a coil spring 216, but biasing members other than coil springs may be used in alternative embodiments. The spring 216 is held between the latch 206 and a shoulder 218 of the ridge 146. The handle 208 is connected to the latch 206 via a bridge 220 that extends through a channel 222 in the ridge 146.

By a user pulling the handle 208 in a release direction 224 away from the panel 202 with enough force to overcome the resiliency of the spring 216, the latch 206 is moved in the release direction 224 to the retracted position. In the retracted position, the latch 206 does not extend above the panel 202, which allows the panel 202 to be removed from the lid 108. For example, the end 225 of the latch 206 does not cross beyond the outer edge 212 of the panel 202 when in the retracted position, so the latch 206 does not block the panel 202 from being lifted upward out of the depression 144.

In the illustrated embodiment, the latch 206 has a tapered top surface 230 which allows the latch 206 to move automatically from the extended position to the retracted position as the solar panel 202 is placed into the depression 144. For example, a lower corner 232 of the panel 202 engages the tapered surface 230 as the panel 202 is lowered onto the latch 206. The angle of the tapered surface 230 allows the lower corner 232 of the panel 202 to gradually move the latch 206 in the release direction 224 (without the user manipulating the handle 208) until the panel 202 has room to move beyond the latch 206 into the depression 144. Since the latch 206 is biased in the extended position, the latch 206 moves back towards the extended position when the force exerted by the panel 202 is removed.

As shown in FIG. 9, the latch 206 in the extended position and the inner wall 214 of the ridge 146 define a slot 240 that accommodates the outer edge 212 of the solar panel 202 therein to secure the panel 202 to the lid 108. In an alternative embodiment, instead of (or in addition to) the latches 206, the ridge 146 may define a slot (not shown) along the inner wall 214 that receives the outer edge 212 of the panel 202 therein to secure the panel 202 to the lid 108. For example, the ridge 146 may be composed of a compressible material which allows the panel 202 to be received within the slot and removed from the slot via an interference or compression fit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A storage container comprising:
a body defining a compartment that is accessible through an opening along a top end of the body, the compartment defined between first and second side walls of the body, wherein each of the first and second side walls includes a respective cavity that is recessed from a respective exterior surface of the side wall, wherein a perimeter of each of the cavities is defined by a rim that projects inward from the exterior surface, wherein each of the rims of the first and second side walls has a ceiling portion at a top of the respective cavity that is configured to allow a person to lift the storage container without grasping the handles;
a lid connected to the top end of the body and movable relative to the body between a closed position and an open position, the lid in the closed position enclosing the compartment; and
two handles tethered to the first and second side walls via cords, each of the two handles elongated between a first end and a second end thereof, wherein the handles are configured to nest within the cavities of the corresponding side walls when not grasped by a person,
wherein the ceiling portion of each of the rims defines two rabbit ear indents configured to receive the cords therein when the handles are pulled out of the cavities by a person to increase a distance that the handles extend from the cavities.

2. The storage container of claim 1, wherein each of the handles is a monolithic rod that defines two apertures spaced apart from each other and spaced apart from the first and second ends along the length of the rod, the two apertures configured for receiving one or more of the cords therethrough.

3. The storage container of claim 2, wherein each of the handles is hollow and defines a hollow space that is fluidly connected to the two apertures to allow for routing a single one of the cords through both of the apertures and the hollow space.

4. The storage container of claim 1, wherein the rim of each of the first and second side walls defines opposing shoulders that segment the respective cavity into a wide region and a narrow region, the narrow region disposed between the wide region and the top end of the body, the wide region having a greater lateral width than the narrow region, wherein the handles nest within the wide regions of the corresponding cavities and the cords cause segments of the handles at the respective first and second ends of the handles to abut the shoulders.

5. The storage container of claim 4, wherein the cords that tether the handles to the first and second side walls extend along the narrow regions of the corresponding cavities and are affixed to the first and second side walls at respective tops of the cavities.

6. The storage container of claim 1, wherein the body has a bottom end opposite the top end, wherein each of the cavities of the first and second side walls extend from the bottom end of the body to a respective top of the cavity that is spaced apart from the top end of the body.

7. The storage container of claim 1, wherein the body includes an inner rail and an outer rail at the top end, the inner rail defining a perimeter of the opening to the compartment, the outer rail surrounding the inner rail and spaced apart from the inner rail to define a trench at the top end.

8. The storage container of claim 7, wherein the inner rail defines notches in a top surface thereof, the notches configured to receive hooks of partitions that divide the compartment.

9. The storage container of claim 7, wherein the outer rail defines slots along a top surface thereof, the slots configured to accommodate hooks for securing accessories along an exterior of the body.

10. The storage container of claim 7, wherein the body includes a front wall between the first and second side walls and the lid includes securing anchors extending from the lid, wherein the outer rail overhangs the front wall and defines retention channels therethrough for receiving the securing anchors therein to secure the lid in the closed position.

11. The storage container of claim 1, wherein the lid includes an interior side that faces the compartment when the lid is in the closed position and an exterior side opposite the interior side, the storage container further comprising a panel removably mounted to the lid along the exterior side.

12. The storage container of claim 11, wherein the exterior side of the lid defines a depression along a central area of the lid, the panel disposed within the depression when mounted to the lid.

13. A storage container comprising:
a body defining a compartment that is accessible through an opening along a top end of the body, wherein the body includes a first side wall and a second side wall opposite the first side wall, each of the first and second side walls includes a respective cavity that is recessed from a respective exterior surface of the side wall, wherein a perimeter of each of the cavities is defined by a rim that projects inward from the exterior surface, the rim of each of the first and second side walls defines opposing shoulders that segment the respective cavity into a wide region and a narrow region, the narrow region disposed between the wide region and the top end of the body, the wide region having a greater lateral width than the narrow region;
a lid connected to the top end of the body via hinges and pivotable relative to the body between a closed position and an open position, the lid having an interior side that engages the top end of the body when in the closed position to enclose the compartment; and
two handles tethered to the body via cords, wherein each of the handles is a rod that linearly extends from a first end to an opposite second end of the rod, the handles are configured to nest within the wide regions of the corresponding cavities and the cords cause the first and second ends of the handles to abut the shoulders when not in use.

14. The storage container of claim 13, wherein the body includes an inner rail and an outer rail at the top end, the inner rail defining a perimeter of the opening to the compartment, the outer rail surrounding the inner rail and spaced apart from the inner rail to define a trench at the top end, wherein the inner rail defines notches in a top surface thereof that are configured to receive hooks of partitions that divide the compartment, and the outer rail defines slots in a top surface thereof that are configured to receive hooks for securing accessories along an exterior of the body.

15. The storage container of claim 13, wherein the rod of each of the handles defines two apertures spaced apart from each other and spaced apart from the first and second ends along the length of the rod, the rod also defines a hollow space therein that is fluidly connected to the two apertures, wherein a single cord of the cords is continuously routed through each of the handles through both of the apertures and the hollow space.

16. The storage container of claim 13, wherein the lid includes an exterior side opposite the interior side, the exterior side defining a depression along a central area of the lid, wherein the storage container further comprises a panel removably mounted to the lid within the depression.

17. The storage container of claim 14, wherein the lid includes securing anchors extending from the lid, wherein the outer rail overhangs a front wall of the body and defines retention channels therethrough, the retention channels configured to receive the securing anchors therein to secure the lid in the closed position.

18. The storage container of claim 13, wherein each of the rims has a ceiling portion at a top of the respective cavity, and the ceiling portion defines two rabbit ear indents configured to receive the cords therein when the handles are pulled out of the cavities by a person to increase a distance that the handles extend from the cavities.

* * * * *